No. 633,873. Patented Sept. 26, 1899.
D. MASON.
APPARATUS FOR CLEANING HULLS OF VESSELS.
(Application filed Nov. 11, 1898.)
(No Model.)
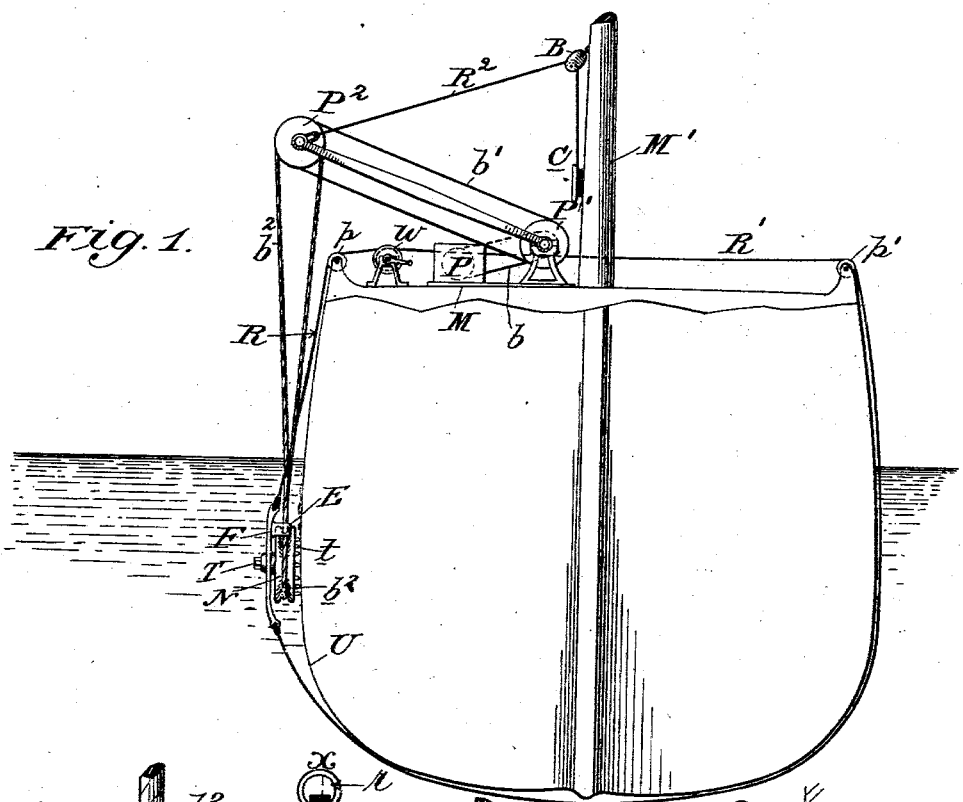
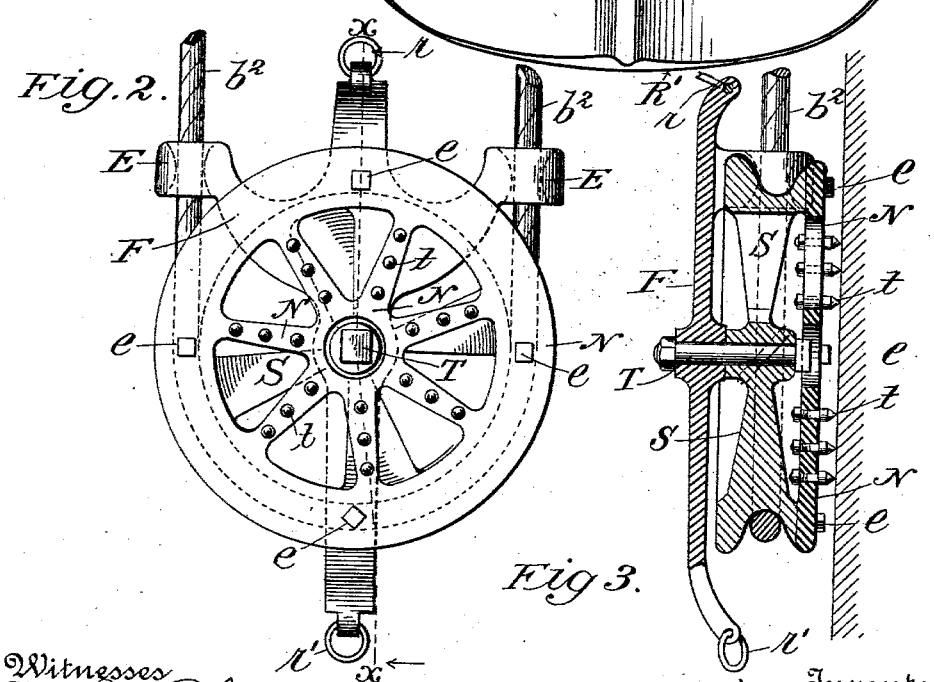

UNITED STATES PATENT OFFICE.

DAVID MASON, OF NEW YORK, N. Y.

APPARATUS FOR CLEANING HULLS OF VESSELS.

SPECIFICATION forming part of Letters Patent No. 633,873, dated September 26, 1899.

Application filed November 11, 1898. Serial No. 696,143. (No model.)

*To all whom it may concern:*

Be it known that I, DAVID MASON, a citizen of the United States, residing at New York, in the county of New York and State of New York, have made a new and useful Invention in Apparatus for Scraping or Cleaning the Bottoms of Vessels, of which the following is a specification.

My invention has for its objects, first, to provide mechanism for thoroughly scraping or abrading the sides and bottoms of vessels afloat and removing therefrom barnacles and such other substances as usually attach themselves thereto, the same being controlled and operated by means on the deck of the vessel or elsewhere above the surface of the water; second, to provide mechanism for thoroughly scraping or abrading the sides and bottoms of vessels afloat and removing therefrom barnacles and such other substances as usually attach themselves thereto, the same being provided with means for raising and lowering it from a point above the surface of the water and additional mechanical means for causing it to more closely adhere to the side or bottom of the vessel, and will be fully understood by referring to the following specification and accompanying drawings, in which—

Figure 1 illustrates an end elevational view of a vessel afloat, illustrating also in elevational view the application of my novel mechanism for thoroughly scraping or abrading and cleaning the sides and bottom thereof without docking it. Fig. 2 is an enlarged side elevational view of my preferred form of mechanism for scraping or abrading; and Fig. 3 is a vertical sectional view of the same, taken on the line $x$ $x$, Fig. 2, and as seen looking at that figure in the direction of the arrows from the right toward the left hand side of the drawings, illustrating also its application to the side of a vessel.

Referring now to the drawings in detail, in all of which like letters of reference represent like or equivalent parts wherever used, U represents the body or hull of a vessel afloat in a body of water. M' represents one of the masts thereof, and F represents the supporting-frame of my preferred scraping or abrading mechanism, the same being made preferably of iron and provided at its top side with two perforated lugs or ears E E, which answer as guide ways for a propelling wire or rope belt $b^2$.

S represents the rotary or movable part of the scraping or abrading mechanism, made of metal in the form of a pulley, with a groove in its outer edge for the propelling wire or rope belt $b^2$ and journaled upon a shaft T, secured to the frame F. The radial arms of the pulley are flattened, as shown in Fig. 2, and are so arranged as to constitute the fan blades or vanes of a propeller, so that when the pulley is rotated in the proper direction the propelling action thereof will tend to maintain the device in close contact with the surface to be scraped or abraded, and also to thoroughly wash or cleanse the same. To one face of the pulley is secured by screws or bolts $e$ $e$ $e$ a detachable face-plate N, having a series of openings so disposed with relation to each other that the intervening parts constitute a series of radial arms, to which are detachably secured by nuts a series of scraping or abrading teeth $t$, made, preferably, of steel and having sharpened points at their exposed ends. The rear side of the rotary or movable part S and the framework F present as much open space as possible, so as to admit of the free circulation of water therethrough and through the openings in the detachable face-plate N. To the opposite ends of the framework F are secured two rings $r$ $r'$, to which are attached ropes R and R', running in opposite directions, entirely around the vessel, over pulleys $p$ $p'$ on the sides thereof to a compound winch $w$, the function of said ropes and winch being to raise and lower the device as desired. The wire or rope belt $b^2$ is twisted, as shown, and passes over a pulley $P^2$, above the deck of the vessel, secured to the outer end of a swinging arm which is pivoted upon a standard to the deck of the vessel, P' P² being additional pulleys for a second driving-belt $b'$.

M is a motor of any preferred form secured to the vessel and provided with a pulley P, $b$ being a belt connecting said pulleys.

R² is a rope secured to the outer end of the swinging arm and passing through a block B, secured to the mast M', $c$ being a cleat on said mast, to which the end of the rope R² is secured.

The operation of the apparatus is as follows: The device is lowered to a position below the surface of the water through the agency of the ropes R R' R² and winch w. The motor is now started, thus imparting rotary motion to the pulleys P P' P² through the belts b b' b² to the rotary scraping or abrading device. Consequently as said device is rotated the propelling action of the fan blades or vanes thereof will tend to force it against the side of the vessel, and at the same time the teeth t will thoroughly scrape or abrade the surface, removing any barnacles or other substances which may be attached thereto. The device is now gradually lowered through the agency of the ropes R R' R², and the clinging action takes place in the manner described entirely beneath one side of the vessel until the mechanism reaches the keel. It is now moved forward or rearward, as desired, through the agency of the ropes R R' the proper distance, and reversed operation takes place until the device again reaches the surface of the water, when the operation is repeated until one side of the vessel is entirely cleaned, the motor M, winch w, pulleys P P', and the attached parts on the deck of the vessel being advanced or retracted accordingly in any manner which will suggest itself to the builder. All of said parts except the pulleys p p' might be attached to a common frame movable back and forth on the vessel, a standard upon said frame taking the place of the mast M'.

Having thus described my invention, what I claim, and desire to secure by Letters Patent of the United States, is—

1. A scraping or abrading device for the sides and bottoms of vessels or other surfaces, consisting of a pulley provided with scraping or abrading teeth and driven by a belt extending to a source of motive power above the water, in combination with means for moving the device to any desired position, and fan blades or vanes attached directly to or constituting a part of said pulley for causing the device when rotated to closely adhere to the side or bottom of the vessel, substantially as described.

2. A scraping or abrading device for the sides and bottoms of vessels or other surfaces, consisting of a pulley provided with scraping or abrading teeth on one face thereof and operatively connected by a series of rope belts with a source of motive power on board of the vessel, in combination with means such as ropes for raising and lowering the same to any desired point, and additional means, in the nature of a propeller, for causing it to closely adhere to the side or bottom of the vessel, said propeller being attached directly to or constituting a part of the pulley, substantially as described.

3. A scraping or abrading device for the sides and bottoms of vessels or other surfaces, consisting of an open pulley journaled in a frame and provided on one face with scraping or abrading teeth, together with fan blades or vanes connected directly to the pulley in such manner as to force the device against the sides of the vessel when in operation; a rope or belt operatively connected with a source of power and additional ropes secured to the opposite sides of the frame, all of said parts acting substantially as and for the purpose described.

In testimony whereof I have hereunto subscribed my name this 10th day of November, 1898.

DAVID MASON.

Witnesses:
JAMES P. J. MORRIS,
M. F. KEATING.